(12) United States Patent
Matsumoto

(10) Patent No.: US 7,773,957 B2
(45) Date of Patent: Aug. 10, 2010

(54) MOBILE COMMUNICATION TERMINAL WITH ROTATIONAL DISPLAY UNIT

(75) Inventor: Katsumi Matsumoto, Kumi-shi (KR)

(73) Assignee: Samsung Electronics Co., Ltd (KR)

( * ) Notice: Subject to any disclaimer, the term of this patent is extended or adjusted under 35 U.S.C. 154(b) by 1372 days.

(21) Appl. No.: 10/335,722

(22) Filed: Jan. 2, 2003

(65) Prior Publication Data

US 2004/0203527 A1    Oct. 14, 2004

(30) Foreign Application Priority Data

Jul. 22, 2002    (KR)    ..................... 10-2002-0042897

(51) Int. Cl.
*H04B 1/38*    (2006.01)
*H04M 1/00*    (2006.01)

(52) U.S. Cl. ................... 455/90.3; 455/556.1; 455/566; 455/575.3; 455/575.4

(58) Field of Classification Search ................ 455/566, 455/575.1, 575.3, 550.1, 90.3, 556.1, 556.2, 455/575.4
See application file for complete search history.

(56) References Cited

U.S. PATENT DOCUMENTS

| | | | |
|---|---|---|---|
| 5,708,561 A | | 1/1998 | Huilgol et al. |
| 6,549,789 B1 * | | 4/2003 | Kfoury ..................... 455/550.1 |
| 6,728,557 B1 * | | 4/2004 | Tracy et al. ............... 455/575.3 |
| 2001/0004269 A1 * | | 6/2001 | Shibata et al. ......... 348/333.06 |
| 2002/0016191 A1 * | | 2/2002 | Ijas et al. ..................... 455/575 |
| 2002/0187818 A1 * | | 12/2002 | Kang .......................... 455/575 |
| 2003/0013417 A1 * | | 1/2003 | Bum ........................... 455/90 |

FOREIGN PATENT DOCUMENTS

| | | |
|---|---|---|
| CN | 1324169 | 11/2001 |
| CN | 1337812 | 2/2002 |
| DE | 197 26 602 | 6/1997 |
| EP | 1 324 572 | 7/2003 |
| WO | WO 01/84728 | 11/2001 |

\* cited by examiner

*Primary Examiner*—Quochien B Vuong
(74) *Attorney, Agent, or Firm*—The Farrell Law Firm, LLP

(57) ABSTRACT

Disclosed is a mobile communication terminal provided with a rotational display unit. The mobile communication terminal comprises: (a) a main housing comprising a first hinge axis formed on one end; (b) a connection member hingedly connected to the main housing so as to be opened from and closed into the main housing around the first hinge axis, and comprising a second hinge axis on the upper surface of the connection member and perpendicular to the first hinge axis; and (c) a rotational housing rotatably connected and opposite to the connection member, and rotated around the second hinge axis.

13 Claims, 5 Drawing Sheets

MOBILE COMMUNICATION TERMINAL WITH ROTATIONAL DISPLAY UNIT

This application claims priority to an application entitled "PORTABLE PHONE WITH ROTATIONAL DISPLAY UNIT", filed in the Korean Industrial Property Office on Jul. 22, 2002 and assigned Ser. No. 2002-42897, the contents of which are hereby incorporated by reference.

BACKGROUND OF THE INVENTION

1. Field of the Invention

The present invention relates to a mobile communication terminal such as a cellular phone, a PDA (Personal Digital Assistant), or a HHP (Hand Held Phone), and more particularly to a mobile communication terminal provided with a rotational display unit, thereby allowing a user to conveniently watch VOD (Video On Demand) on the rotational display unit.

2. Description of the Related Art

Usually, mobile communication terminals refer to portable units for communicating with a counterpart via wireless communication. These conventional mobile communication terminals are divided into several types according to their external shapes, wearing locations, and opening and closing methods. For example, the mobile telephone terminals may be divided into bar-type terminals, flip-type terminals, and folder-type terminals, according to their shape or function. The bar-type mobile telephone terminal comprises a bar-type single housing, and the flip-type mobile telephone terminal comprises a bar-type housing and a flip rotatably connected to the bar-type housing by a hinge unit. The folder-type mobile telephone terminal comprises a bar-type housing and a folder rotatably connected to the housing by a hinge unit, thereby being rotatably folded and unfolded.

Further, the mobile telephone terminals may be divided into necklace-type terminals and wristlet-type terminals according to their wearing locations. The necklace type terminal is hung on a user's neck using a string and the wristlet type terminal is held on a user's wrist.

Moreover, the mobile telephone terminals may be divided into rotation-type terminals and sliding-type terminals according to their opening and closing methods. The rotation-type terminal is opened and closed by relative rotational motion of its two housings disposed opposite to each other and rotatably connected to each other. The sliding-type terminal is opened and closed by relative longitudinal sliding motion of its two housings. Those skilled in the art will appreciate the above-described various mobile telephone terminals.

The aforementioned various mobile communication terminals have been miniaturized in order to be handy to carry, thereby being conveniently used only when the user audio-communicates or picture-communicates with a counterpart.

For example, in order to be handy to carry, the conventional mobile communication terminal has a miniaturized and lightweight main body.

However, it is inconvenient to use conventional mobile communication terminals for other specific purposes, such as watching VOD or enjoying a game. The reason is that the size, i.e. the width and length, of a LCD of the mobile communication terminal is very small. That is, the mobile communication terminal of the related art is limited in that the width and length of its LCD corresponds to the dimensions of the housing to which the LCD is affixed.

For reference, in the case of home TVs, a TV provided with a wide or landscape orientated Braun (i.e. cathode ray) tube is popular and recently is being replaced by TVs having a thin LCD which are also landscape, rather than portrait, orientated. Although the conventional mobile communication terminals are devised to be convenient for inputting data thereto and certifying the inputted data in order to achieve the audio or video communication between the user and counterpart, they cause inconvenience in watching VOD due to the small sizes of their LCDs and poor sound quality.

SUMMARY OF THE INVENTION

Therefore, the present invention has been made in view of the above problems, and it is an object of the present invention to provide a mobile communication terminal provided with a rotational display unit, thereby rotating its LCD from a relatively shorter width and a relatively longer height to an angle of 90° and allowing an user to watch VOD (Video On Demand) on the widened visual field of the rotated LCD.

It is another object of the present invention to provide a mobile communication terminal for supplying a wider visual field on its LCD as well as stereophonic sound.

In accordance with the present invention, the above and other objects can be accomplished by the provision of a mobile communication terminal comprising: (a) a main housing comprising a first hinge axis formed on its one end; (b) a connection member hingedly connected to the main housing so as to be opened from and closed into the main housing around the first hinge axis, and comprising a second hinge axis extended on the upper surface of the connection member perpendicularly to the first hinge axis; and (c) a rotational housing rotatably connected to the connection member so as to be opposite to the connection member and rotated around the second hinge axis.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
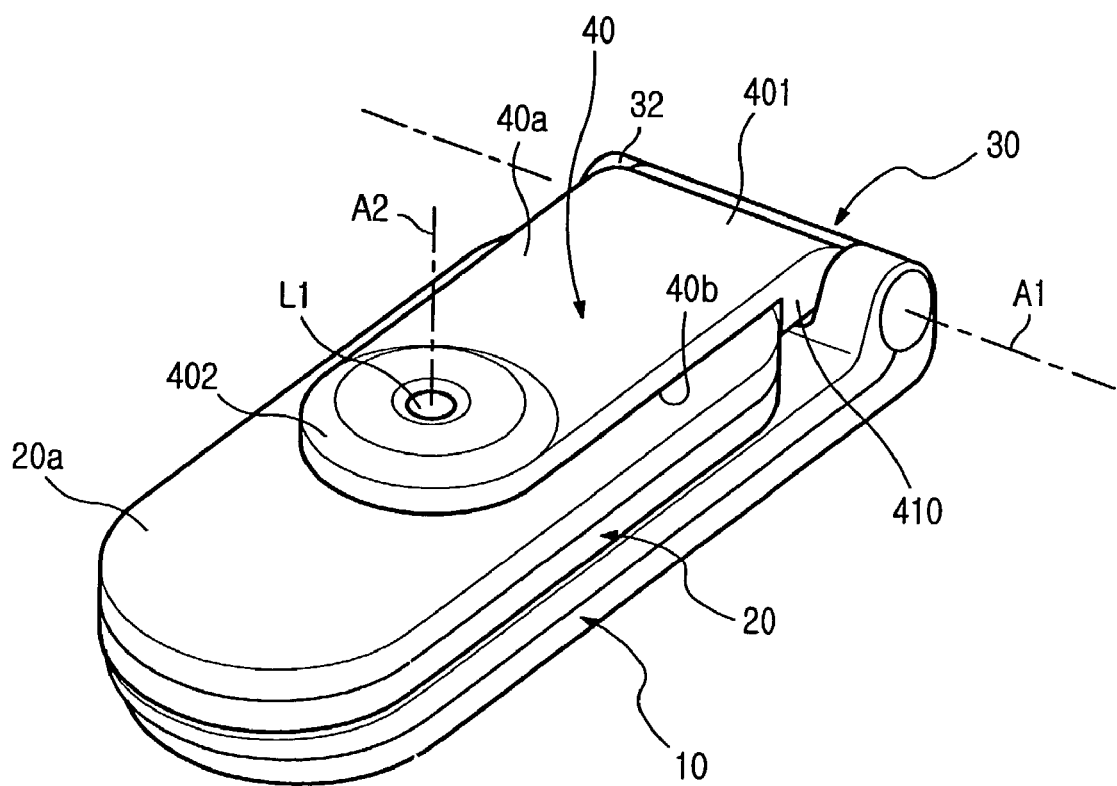
FIG. 1 is a perspective view of a mobile communication terminal in a closed condition of a rotational housing into a main housing in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein is omitted to avoid making the subject matter of the present invention unclear.

As shown in FIGS. 1 to 5, a mobile communication terminal provided with a rotational display unit in accordance with a preferred embodiment of the present invention comprises a bar-type main housing 10, a connection member 40, and a rotational housing 20. The main housing 10 comprises a first hinge axis (A1) accommodated by a hinge unit 30 installed on one end of the main housing 10. The connection member 40 is hinged to the main housing 10 by the hinge unit 30 so as to be rotatably opened from and closed into the main housing 10 around the first hinge axis (A1).

The rotational housing 20 is connected to the connection member 40 so as to also be opened from and closed into the main housing 10 around the first hinge axis (A1), and the rotational housing 20 also rotates around a second hinge axis (A2) perpendicularly extended from an upper surface 40a of the connection member 40.

The first hinge axis (A1) is an axis of the hinge unit 30, which connects the connection member 40 to the main housing 10, around which the connection member 40 opens from and closes into the main housing 10. The second hinge axis (A2) is an axis around which the rotational housing 20 rotates relative to the connection member 40. That is, the second hinge axis (A2) is spaced apart from the first hinge axis (A1) by a designated distance and the second hinge axis (A2) is perpendicular to the first hinge axis (A1).

The bar-type main housing 10 includes an upper surface 10a, a lower surface 10b, and side surfaces 10c. The hinge unit 30 provided with the first hinge axis (A1) is disposed on one end of the main housing 10, and an other end of the main housing 10 is convex arc-shaped with a designated radius of curvature. A keypad 12, which includes an array of a plurality of keys, is disposed on the upper surface 10a of the main housing 10. A user inputs desired data to the mobile communication terminal by a pressing action on the keypad 12. A battery pack (not shown) for supplying power is attached to the lower surface 10b of the main housing 10. A rotational lens housing 32, which includes a rotational camera lens (L2), is installed on one side of the hinge unit 30 installed on one end of the main housing 10. The rotational lens housing 32 is rotated at a designated angle along the first hinge axis (A1). A microphone unit 14 is disposed on the upper surface 10a of the main housing 10 near the keypad 12.

One end 401 of the connection member 40 is hinged to the hinge unit 30 and an other end 402 of the connection member 40 is connected to an upper surface 20a of the rotational housing 20 that is opposite to the rotational housing 20. The connection member 40 is provided with an auxiliary member 410. The auxiliary member 410 is formed on one end of the connection member 40 and protrudes from the lower surface of the connection member 40, thereby forming a stepped side surface 412. Preferably, the stepped side surface 412 of the auxiliary member 410 is concave arc-shaped with a designated radius of curvature. As described below, a side surface 20c of one end of the rotational housing 20 is convex arc-shaped with the same radius of curvature as that of the stepped side surface 412 of the auxiliary member 410. Therefore, the side surface 20c of the rotational housing 20 is coupled with the stepped side surface 412 of the auxiliary member 410, and then the rotational housing 20 is smoothly rotated around the second hinge axis (A2) so as to separate the side surface 20c of the rotational housing 20 from the stepped side surface 412 of the auxiliary member 410.

A stationary camera lens (L1) is installed on a central area of the other end 402 of the upper surface 40a of the connection member 40. Herein, the stationary camera lens (L1) is installed on the connection member 40 so as to face upward in a perpendicular direction to the upper surface 20a of the rotational housing 20. That is, the facing direction of the stationary camera lens (L1) is the same as the axial direction of the second hinge axis (A2).

The rotational housing 20 includes the upper surface 20a, a lower surface 20b, and side surfaces 20c. The end 402 of the connection member 40 is connected to the upper surface 20a of the rotational housing 20 by a hinge unit (not shown), and a display unit 22 such as a wide LCD is installed on the lower surface 20b of the rotational housing 20. At least one speaker unit is installed on the lower surface 20b of the rotational housing 20. Preferably, first and second speaker units 24 and 26 are installed on the lower surface 20b of the rotational housing 20, thereby supplying stereophonic sound. That is, the first and second speaker units 24 and 26 are individually installed on the lower surface 20b of the rotational housing 20 at both sides of the wide LCD 22.

Both ends of the rotational housing 20 are convex arc-shaped, thereby being smoothly rotated from the contact surface with the concave arc-shaped side surface 412 of the auxiliary member 410 of the connection member 40.

Figure 2:
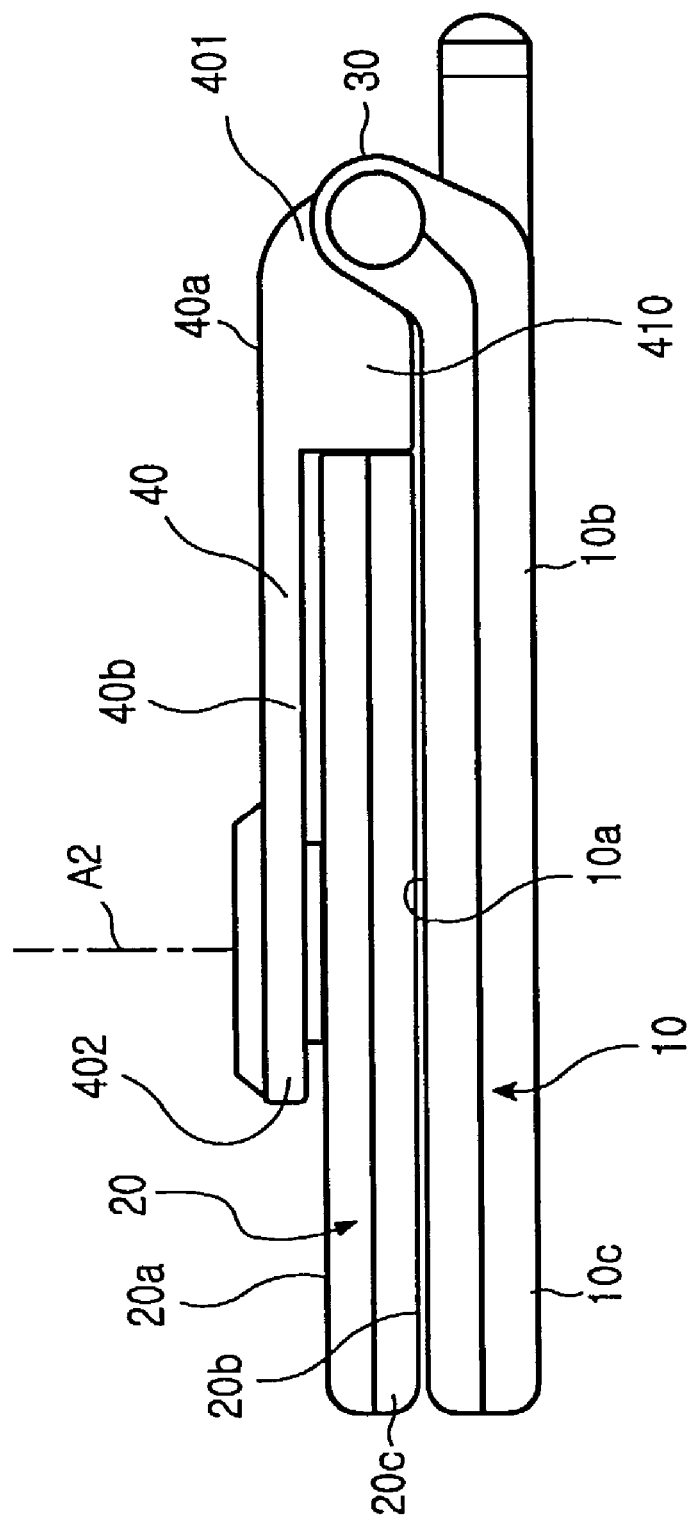
FIG. 2 is a side view of the mobile communication terminal of FIG. 1.
Figure 3:
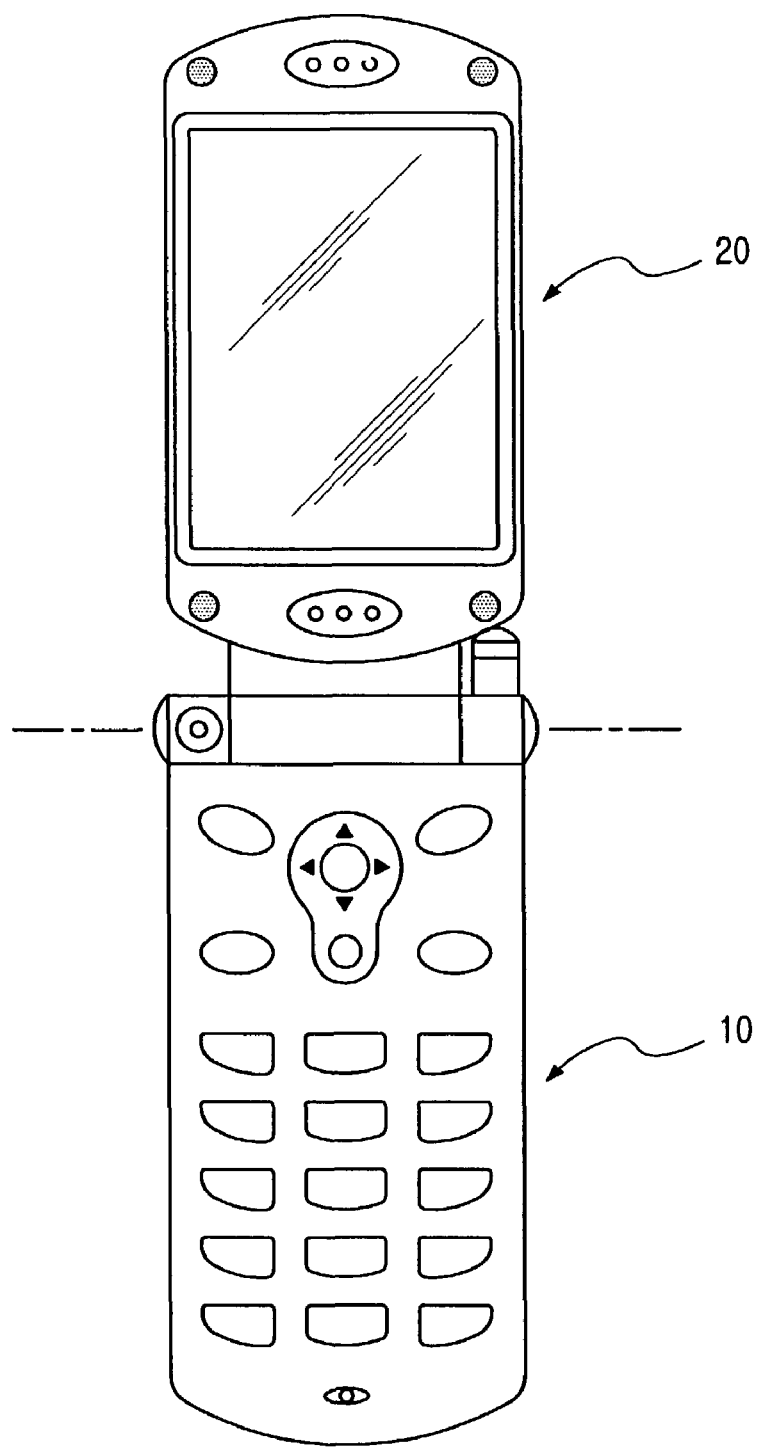
FIG. 3 is a plan view of the mobile communication terminal in an opened condition of the rotational housing from the main housing in accordance with the preferred embodiment of the present invention.
Figure 4:
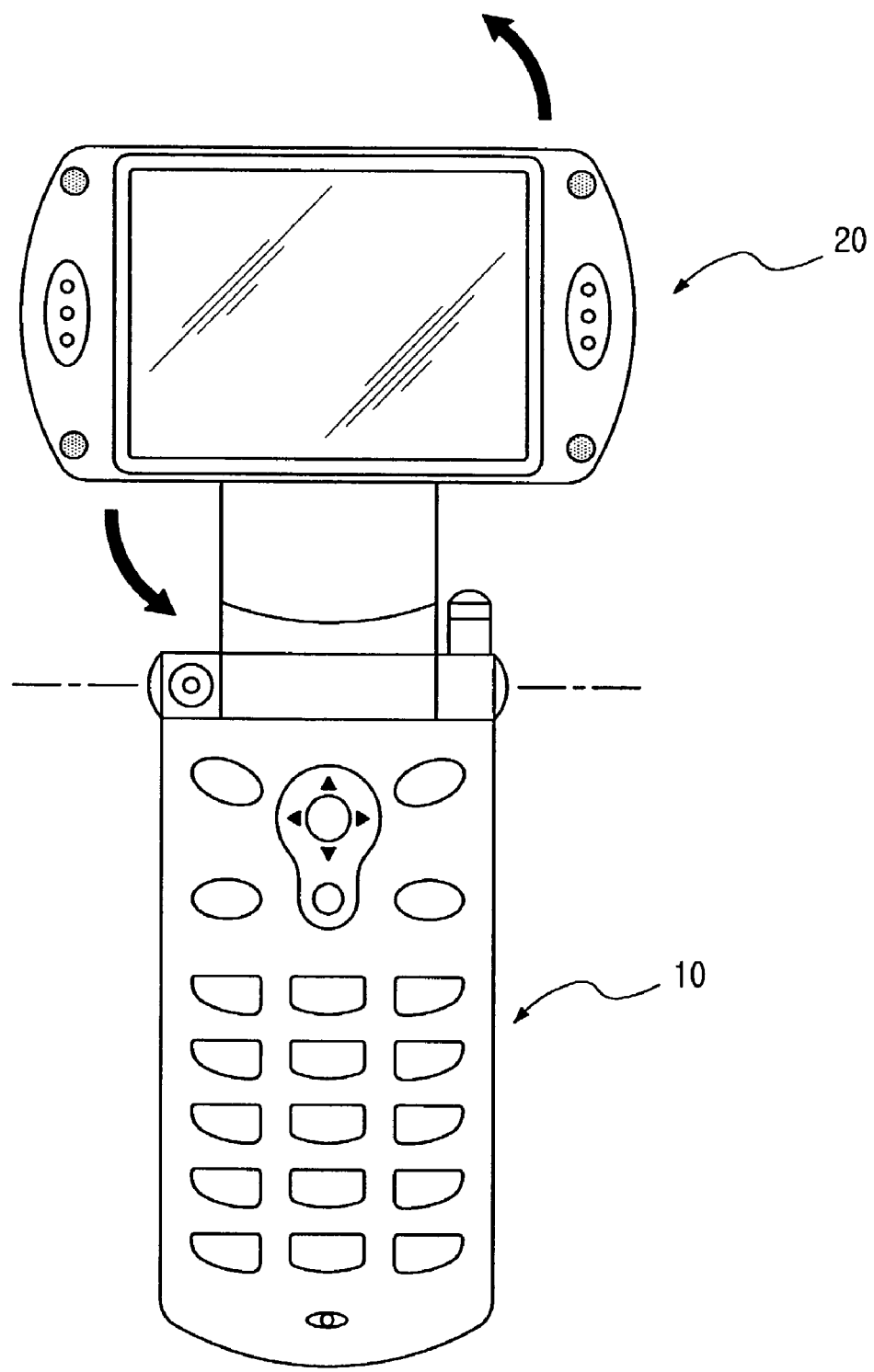
FIG. 4 is a plan view of the mobile communication terminal in a 90° rotated condition of the rotational housing opened from the main housing in the counterclockwise direction in accordance with the preferred embodiment of the present invention.
Figure 5:
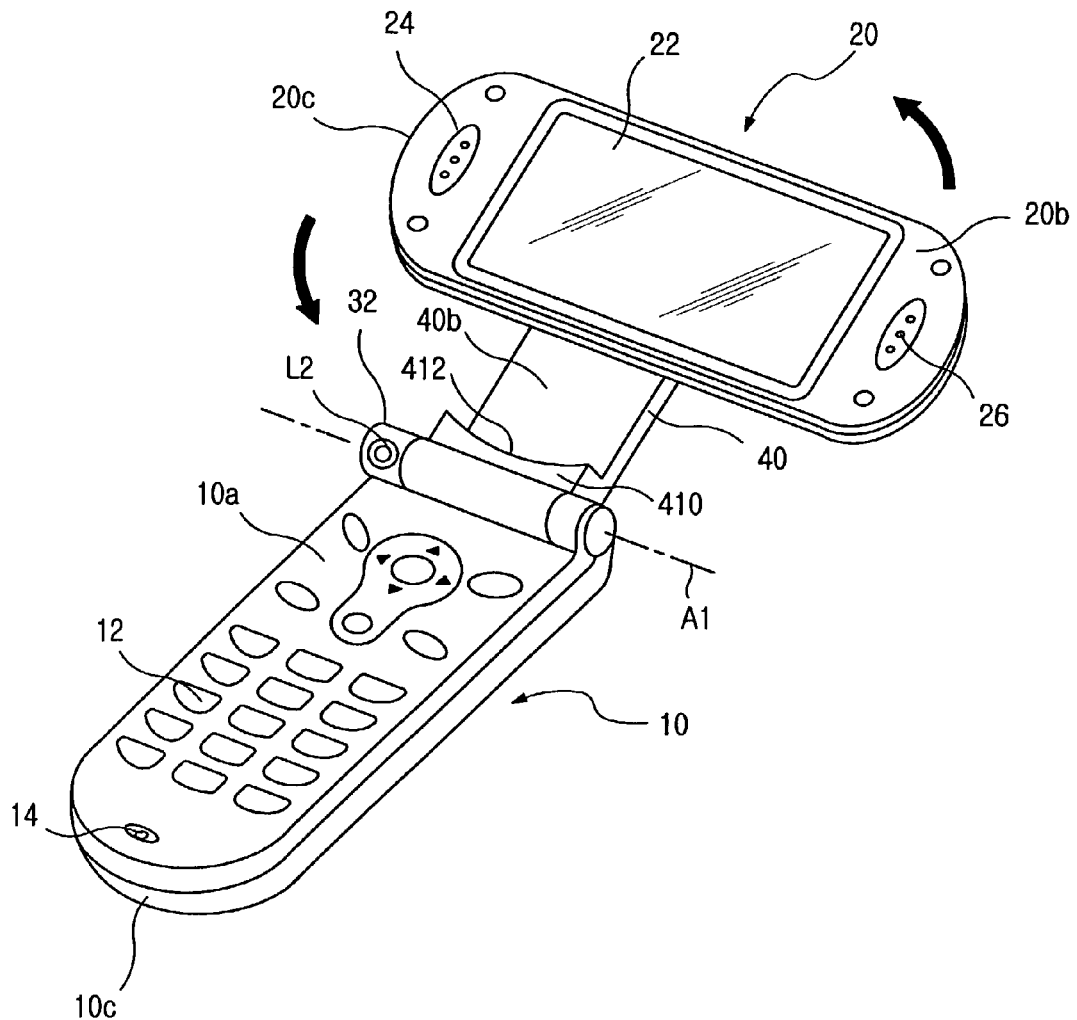
FIG. 5 is a perspective view of the mobile communication terminal of FIG. 4.

FIGS. 1 and 2 show the closed condition of the rotational housing 20 folded into a main housing 10. FIGS. 1 and 2 are in a stand-by or power-off mode. FIG. 3 shows the opened condition of the rotational housing 20 opened away from the main housing 10. FIG. 3 is in a calling mode. FIGS. 4 and 5 show the 90° rotated condition of the rotational housing 20 from the connection member 40. FIGS. 4 and 5 are in a VOD operating mode for allowing the user to more conveniently watch VOD (Video On Demand) on the wide LCD. In the VOD operating mode of FIGS. 4 and 5, the first and second speaker units 24 and 26 are operated, thereby supplying stereophonic sound. Therefore, the user can watch VOD using the wide LCD 22 with a wider visual field, and listen with the first and second speaker units 24 and 26. Specifically, an orientation of data displayed on the wide LCD 22 is changed in accordance with the calling mode and the VOD operating mode. The orientation of data displayed on the wide LCD 22 in the VOD operating mode must be changed by rotating the orientation of the data by an angle of approximately 90° from the normal orientation of data displayed on the LCD 22 in the calling mode.

Preferably, the user may take a picture of an object or picture-communicate with a counterpart using the stationary and rotational camera lens, (L1) and (L2).

As apparent from the above description, the mobile communication terminal of the present invention allows the user to conveniently watch VOD. Further, the mobile communication terminal of the present invention supplies a stereophonic sound, thereby allowing the user to further enjoy watching VOD.

Although only a few embodiments of the present invention have been described in detail, those skilled in the art will appreciate that various modifications, additions, and substitutions to the specific elements are possible, without departing from the scope and spirit of the invention as disclosed in the accompanying claims.

What is claimed is:

1. A mobile communication terminal comprising:
 (a) a main housing comprising a first hinge axis formed on one end;
 (b) a connection member hingedly connected to the main housing so as to be opened from and closed into the main housing around the first hinge axis, and comprising a second hinge axis spaced apart from and perpendicular to the first hinge axis; and (c) a rotational housing rotatably connected to the connection member, wherein the rotational housing rotates around the second hinge axis, and the second hinge is connected to an upper surface of the rotational housing opposite to the connection member, and the rotational housing includes at least one convex arc-shaped end having a designated radius of curvature, wherein the connection member further comprises an auxiliary member formed on one end of the connection member and being concave arc-shaped with the designated radius of curvature, thereby forming a stepped side surface enabling smooth rotation of the rotational housing around the second hinge axis.

2. The mobile communication terminal as set forth in claim 1, wherein the main housing further comprises a keypad provided with an array of a plurality of keys.

3. The mobile communication terminal as set forth in claim 1, wherein the rotational housing comprises a wide LCD.

4. The mobile communication terminal as set forth in claim 3, wherein the rotational housing comprises at least one speaker unit.

5. The mobile communication terminal as set forth in claim 3, wherein the rotational housing comprises two speaker units, each being individually installed on both ends of the rotational housing, thereby supplying stereophonic sound.

6. The mobile communication terminal as set forth in claim 1, wherein the rotational housing comprises a wide LCD installed on the rotational housing and first and second speaker units, each being individually installed at both sides of the wide LCD.

7. The mobile communication terminal as set forth in claim 1, wherein one end of the connection member is connected to the first hinge axis and an other end of the connection member is connected to an upper surface of the rotational housing.

8. The mobile communication terminal as set forth in claim 1, further comprising a rotational camera lens housing installed on one side of the first hinge axis and provided with a rotational camera lens.

9. The mobile communication terminal as set forth in claim 1, wherein the connection member further comprises a stationary camera lens.

10. The mobile communication terminal as set forth in claim 9, wherein the stationary camera lens faces upward in a perpendicular direction to an upper surface of the rotational housing.

11. The mobile communication terminal as set forth in claim 1, wherein the rotational housing rotates around the second hinge axis to at least an angle of 90°.

12. A mobile communication terminal comprising:

(a) a main housing comprising a first hinge axis formed on one end;

(b) a connection member hingedly connected to the main housing so as to be opened from and closed into the main housing around the first hinge axis, and comprising a second hinge axis spaced apart from and perpendicular to the first hinge axis; and (c) a rotational housing rotatably connected to the connection member, wherein the rotational housing rotates around the second hinge axis, and the second hinge is connected to an upper surface of the rotational housing opposite to the connection member, and further wherein the rotational housing comprises at least one speaker unit, and an auxiliary member formed on one end of the connection member and being concave arc-shaped with a designated radius of curvature, thereby forming a stepped side surface enabling smooth rotation of the rotational housing around the second hinge axis.

13. A mobile communication terminal comprising:

(a) a main housing comprising a first hinge axis formed on one end;

(b) a connection member hingedly connected to the main housing so as to be opened from and closed into the main housing around the first hinge axis, and comprising a second hinge axis spaced apart from and perpendicular to the first hinge axis; and (c) a rotational housing rotatably connected to the connection member, wherein the rotational housing rotates around the second hinge axis, and the second hinge is connected to an upper surface of the rotational housing opposite to the connection member, and further wherein the rotational housing comprises a display, two speaker units, each being individually installed on both ends of the display, thereby supplying stereophonic sound, and an auxiliary member formed on one end of the connection member and being concave arc-shaped with a designated radius of curvature, thereby forming a stepped side surface enabling smooth rotation of the rotational housing around the second hinge axis.

* * * * *